(No Model.)
W. R. PHILLIPS.
APPARATUS FOR BLEACHING.
No. 384,867. Patented June 19, 1888.
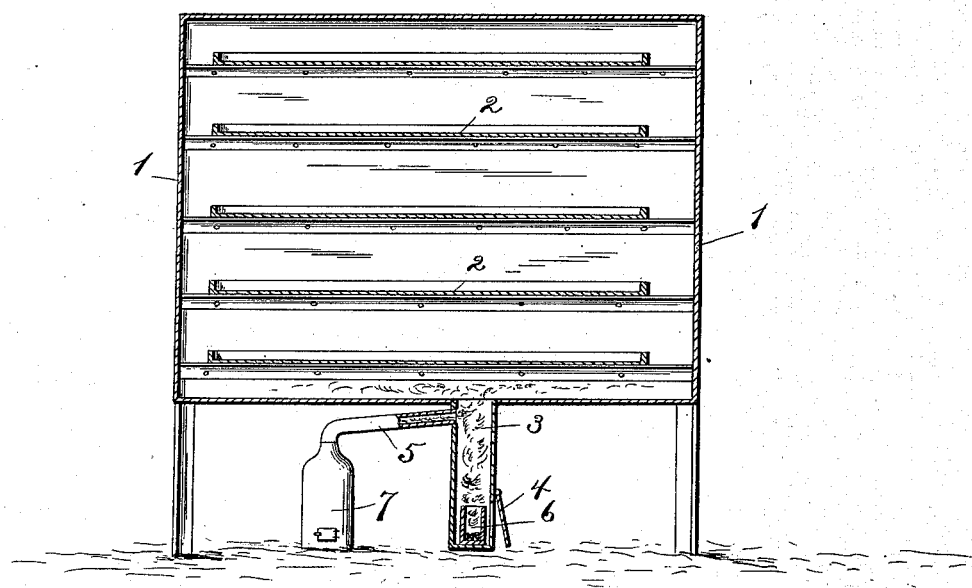
WITNESSES.
INVENTOR.
William R. Phillips,
by Louis Bagger & Co
Attorneys

UNITED STATES PATENT OFFICE.

WILLIAM R. PHILLIPS, OF MILFORD, DELAWARE.

APPARATUS FOR BLEACHING.

SPECIFICATION forming part of Letters Patent No. 384,867, dated June 19, 1888.

Application filed September 4, 1886. Renewed March 16, 1888. Serial No. 267,322. (No model.)

*To all whom it may concern:*

Be it known that I, WILLIAM R. PHILLIPS, a citizen of the United States, and a resident of Milford, in the county of Kent and State of Delaware, have invented certain new and useful Improvements in Apparatus for Bleaching; and I do hereby declare that the following is a full, clear, and exact description of the invention, which will enable others skilled in the art to which it appertains to make and use the same, reference being had to the accompanying drawing, which forms a part of this specification, and illustrates a sectional view of my improved bleaching apparatus.

My invention has relation to apparatus for bleaching fruit and all other articles requiring bleaching; and it consists in the improved construction and combination of parts of such an apparatus for bleaching fruit and other articles, as hereinafter more fully described and claimed.

In bleaching evaporated fruit, for which purpose my apparatus is principally intended, there have been great drawbacks to overcome in the shape of a disagreeable taste added to the fruit by the sulphur used in bleaching it, and the sulphur will only bleach fruit which is not perfectly dry, failing to have any effect upon fruit which is perfectly dry and in the best condition for packing; and for the purpose of getting over these drawbacks I have invented the apparatus which I shall now proceed to describe, having found by experiment that the sulphur will bleach fruit more perfectly and without giving any taste to the fruit when mixed with steam, the same effects being also accomplished upon straw goods, woolen goods, and all other articles which are bleached by the use of sulphur.

In the accompanying drawing, the numeral 1 indicates a casing having suitable means for supporting the trays holding the fruit, the said casing being of any suitable shape and material, and the trays 2 being of any suitable construction and supported by any suitable means.

A tube, 3, of sheet metal opens into the bottom of the casing and has an upwardly-swinging door, 4, at its lower end, and a cup, 6, containing burning sulphur fits in the lower end of the tube, being inserted through the door. A pipe, 5, extends from a suitable steam-boiler, 7, having any suitable means for heating it, and this pipe extends toward and opens into the upper portion of the sheet-metal tube some distance below the bottom of the casing.

When the apparatus is used, the boiler is filled and steam raised, whereupon the cup is filled with sulphur and fired and placed into the sheet-metal tube through the swinging door, and the fumes of the burning sulphur will mingle with the steam and enter the casing of the bleacher, bleaching the fruit. The steam will give sufficient moisture to the fruit to allow the sulphur to act upon it and bleach it, and the fruit bleached with this mixture will not receive any taste of the sulphur. By mixing the fumes of the sulphur a smaller quantity of sulphur may be used, so that the method and apparatus will cause a saving in the cost of bleaching the fruit, as well as prevent the fruit from receiving a bad taste from the sulphur-fumes.

In devices heretofore used for mixing the fumes of sulphur, niter, sulphuric acid, &c., with steam for the treatment of wool, &c., steam at a high temperature has been admitted to the room at one point and the gases at another; but as this plan requires a more cumbrous device than that described above, and as the steam and gases are not so thoroughly commingled as where they enter together and thus act upon the contents the same in any part of the room, I do not make any broad claim to such construction, as in them the contents in one portion of the room are subjected to a stronger solution of the bleaching medium than at another point where it is weakened by the excess of steam entering at that point.

Numerous modifications may be made in the construction of the apparatus without departing from the spirit of my invention, and the bleaching-casing and the trays and their supports may be of any suitable construction, no claims being made for any special construction of the parts of the apparatus.

Having thus described my invention, I claim and desire to secure by Letters Patent of the United States—

In an apparatus for bleaching, the combination of a casing having means for supporting trays, a tube having a swinging door at its lower end and opening into the bottom of the casing with its upper end, a cup for holding burning sulphur fitting in the lower end of the tube, and a steam-boiler having a pipe entering the upper portion of the tube, as and for the purpose shown and set forth.

In testimony that I claim the foregoing as my own I have hereunto affixed my signature in presence of two witnesses.

WILLIAM R. PHILLIPS.

Witnesses:
   LOUIS BAGGER,
   GEO. E. FRECH.